UNITED STATES PATENT OFFICE.

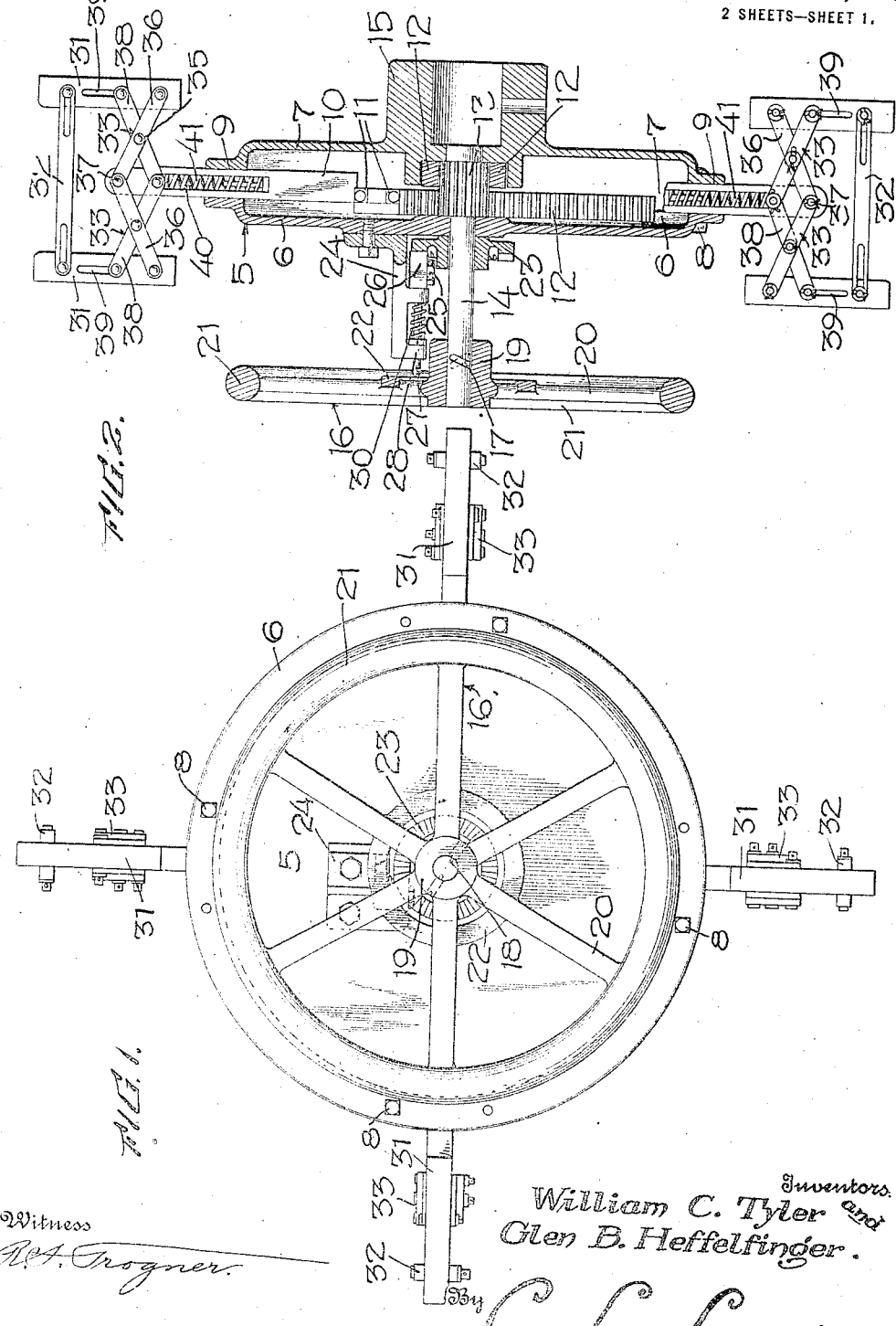

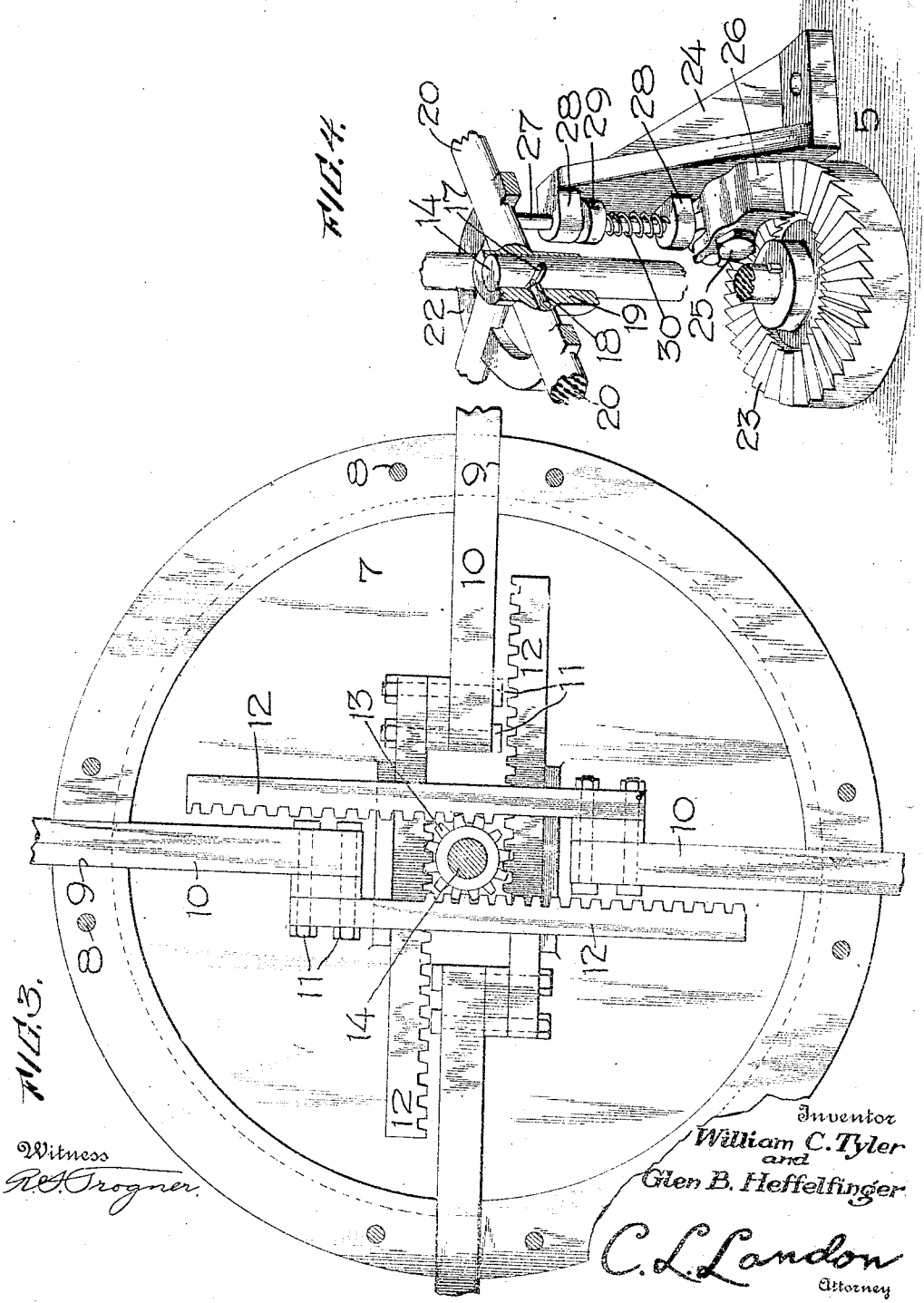

WILLIAM C. TYLER AND GLEN B. HEFFELFINGER, OF AKRON, OHIO, ASSIGNORS TO THE GOODYEAR TIRE & RUBBER COMPANY, OF AKRON, OHIO, A CORPORATION OF OHIO.

TIRE-MOUNTING CHUCK.

1,251,138.  Specification of Letters Patent. Patented Dec. 25, 1917.

Application filed September 23, 1916. Serial No. 121,860.

*To all whom it may concern:*

Be it known that we, WILLIAM C. TYLER and GLEN B. HEFFELFINGER, citizens of the United States, residing at Akron, in the county of Summit and State of Ohio, have invented new and useful Improvements in Tire-Mounting Chucks, of which the following is a specification.

Our present invention relates to tire-mounting chucks, and contemplates as one of its objects the provision of a chuck having support arms which are quickly extensible to their full limit of movement, or as quickly retractable from their extended positions by a single revolution of the control wheel.

It is a further object of the invention to provide a chuck having support arms simultaneously extensible by a single hand wheel and constantly lockable thereby in their extended positions, yet automatically subject to unlocking movements of the hand wheel.

It is a still further object of the invention to provide tire-support means with which the extensible support arms of a chuck may be equipped in order that the weight of the tire may serve to clamp the tire-support means all the more firmly thereabout.

The chucks now in common use usually consist of a casing from which a number of support arms are extensible by rotation of a control wheel, which carries a beveled gear meshing with pinions carried upon the respective support arms. The disadvantage of this type of chuck lies in the fact that it usually requires more than a few revolutions of the hand-wheel to extend the support arms to their outermost limits, owing to the fact that a rotational movement of a portion of the support arms is required.

The chuck comprehended by the invention we propose herein extends the support arms by a direct and radial thrust from the chuck casing and locks them in any position of extension by means which are automatically controllable by a mere ordinary operation of the hand wheel.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a face view of our tire-mounting chuck;

Fig. 2 is a vertical sectional view taken through the chuck;

Fig. 3 is an enlarged view of the interior of the chuck, the casing front having been removed; and Fig. 4 is a perspective detail illustrating the operation of the automatic locking means for the extensible chuck arm.

In assembling our chuck, we employ a two-part casing which is denoted as a whole by the numeral 5 and which includes a shallow circular front portion 6 and a deeper rear portion 7, these portions being mated to form the casing 5 through the medium of peripherally engaged bolts 8. A number of radial slots 9 are provided in the edge portion of the rear casing part 7 for the accommodation of the extensible support arms 10. We preferably provide four of these support arms but a greater or less number may be employed. Each of the arms 10 extends into the hollow portion of the casing 5 and is secured by means 11 to the extremity of a rack bar 12. The rack bars are grouped in pairs, the vertically extensible bars being arranged to one side of the horizontally extensible bars in the manner clearly illustrated in Figs. 2 and 3 in order that a single operating pinion 13 may simultaneously engage all of the rack bars and control the extension of their support arms. The pinion 13 is, of course, of double the width of one rack bar in order to mesh simultaneously with those of the two pairs. If six support arms are arranged for the chuck the pinion 13 is then of triple the width of any one rack bar. It should be noted that the support arms 10 are each offset by the means 11 from the respective rack bars to which they are connected to permit the plan of grouping of which we make use.

The pinion 13 is mounted within the hollow portion of the casing 5 upon the extremity of the operating shaft 14, in opposite front and back portions 6 and 7 of the casing which are enlarged to provide bearings for this shaft on each side of the operating pinion. The rear casing half 7 carries the socket enlargement 15 whereby the chuck as a whole may be mounted upon a shaft or other revoluble member, in the customary manner.

At the outermost extremity of the operating shaft 14 there is mounted the control wheel 16 in such a way as to have a differential movement with respect to the shaft which it operates. Upon opposite sides of the shaft 14 there is formed a pair of short helical grooves 17 commonly arranged on the same line of helical definition. In these grooves are accommodated pins 18 arranged to project inwardly from the hub 19 of the operating hand wheel.

This latter has a number of spokes 20 radiating outwardly from the hub 19 and carrying the wheel rim 21 which the operator of the chuck grasps to control movement of the pinion 13. A circlet 22 of short radius is carried upon the spokes of the wheel in the manner clearly illustrated, particularly in Figs. 2 and 4, in order to present an annular flat surface rearwardly.

There is now to be described the automatically operable locking means whereby the support arms of the chuck are adapted to be maintained in any of their extended positions. This locking means includes a ratchet wheel 23 which is keyed upon the operating shaft 14. A bracket 24 secured to the front casing portions 6 pivotally mounts, as shown at 25, a pawl or detent 26 which is in locking engagement with the teeth of the ratchet 23. A pivotal link 27 is connected to the detent 26 and is slidable in bearings 28 carried by the bracket member 24. A collar 29 is secured intermediately of this link and the expansible coil spring 30 is interposed between the collar and the innermost bearing 28 in the manner illustrated in detail in Fig. 4. The action of this spring is such that it tends to force the detent into locking engagement with the teeth of the ratchet 23. The extremity of the control link or stem 27, however, is in contact with the circlet 22 carried upon the control wheel 16.

When the wheel is given a rotational movement in the clockwise direction of Figs. 1 and 2 (which will serve to extend the support arms of the chuck), the first movement of rotation of the hand wheel does not effect the operating shaft 14, since the pins 18 merely move from the top to the bottom of the slots 17. On encountering the bottom edges of the slots the pins then transmit the clockwise rotation of the hand wheel to the shaft 14 but meanwhile the initially differential movement of the hand wheel outwardly along the shaft 14, prior to the transmission of rotary movement to the latter has removed the circlet 22 from such contact with the control stem 27 that the expansible spring 30 is enabled to engage the detent 26 firmly with the ratchet teeth. Continuous rotation of the hand wheel in this clockwise direction causes the simultaneous extension of both pairs of rack bars 12, and consequently of all of the respective support arms 10.

The ratchet and its detent now form a positive lock against any retrograde movement of the support arms due to the weight which they carry, and this locking of the arms in their extended position continues until the hand wheel is rotated in a counter-clockwise direction for the retraction of the arms.

At the beginning of the counter-clockwise rotation the hand wheel 16 is again accorded a differential movement with respect to the operating shaft 14, but this time inwardly along the shaft until the pins 18 have moved from the bottom to the top of their slots 17. This movement of the hand wheel prior to the transmission of rotary motion to the operating shaft presses the circlet 22 into such engagement with the control stem 27 of the locking means that the detent is released, against the action of the spring 30, from its engagement with the ratchet 23. Accordingly the locking means now offers no resistance to retraction of the support arms, which may be accomplished by a continued counter-clockwise movement of the control wheel.

It should now be clear that the chuck of this invention provides arms extensible by direct radial thrusts and lockable by means which are subject to an automatic selective control on the part of the operating means which projects the arms.

There now remains to disclose the particular tire clamping means which we provide upon each of our support arms 10. These means are illustrated in Fig. 2 and each comprises a pair of parallel bars 31 which are connected by the bars 32, upon which the tires to be supported by our chuck rest during the finishing operations. The bar 32 is slotted in each extremity in order to permit of the convergence of the uprights 31, this latter movement being obtained through the employment of pairs of opposite lazy tongs 33. Each lazy tong includes a pair of crossed bars which are intermediately pivoted as indicated by the numeral 35. One bar 36 of each pair of the tongs is pivoted at 37 to the extremity of the support arm which mounts them, while the other bar 38 of each lazy tongs is operable, at opposite extremities, within a slot 39 formed within its adjacent upright 31, and within the slot 40 which is provided adjacent the extremity of the support arm itself. A spring 41 is operable in each of the support arm slots and is expansible to normally separate the bars 31 to their limit of movement laterally from the support arm.

When a tire has been placed upon the bars 32, however, the weight thereof will be sufficient to counteract the expansible tendency of the spring 40 to some extent. In this case the resultant shifting of the lazy tongs will be such as to clamp the upright 31 all the more firmly against the bead edges of the tire so that our tire mounting means is automatically effective to provide the best of clamp supports for the article which they mount upon the chuck. If the tire to be supported be so small that its weight is not sufficient to counteract the expansible tendencies of the supporting springs 41 to such an extent that the clamping bars 31 are tightly engaged against the bead edges of the tire, a continued projection of the support arms from the chuck casing 5, will accomplish the same object, as the tire of course is inextensible.

From the description of our invention embodied in the foregoing, it should now be clear that the improvements comprehended by the chuck which we propose herein fall under three heads: the arrangement of a plurality of extensible support arms in such manner that they may be readily projected from the chuck casing with such directness that a small movement of rotation on the part of the control wheel, (a single rotation being generally sufficient) is ample to move the support arms to their full limit of extension; the provision of means whereby the support arms may be automatically locked in any of their extended positions, and at the same time be automatically unlocked when it is desired to retract the arms into the chuck casing; and the provision of tire mounting means with which the outer extremity of each support arm may be equipped in order that the tire to be mounted may be automatically secured with firmness upon the extensible arms.

While we have shown all of these improvements as embodied in a chuck of unitary design, it is desired to emphasize the fact that any of these improvements, or any combination thereof, may be succesfully employed in chucks of other designs. For instance, we may wish to remove the tire supporting means with which our support arms have been illustrated as equipped, and to substitute therefor the usual "points" which are adapted to engage with the inner periphery of a core, upon which a tire carcass may be laid up.

What we claim is:

1. A chuck including a casing; support arms extensible from the casing; and means to lock the support arms in any of their extended positions with respect to the casing, said locking means being automatically withdrawable from locking position for retraction of said support arms into the casing.

2. A chuck including a casing, support arms radially extensible from the casing; a rack bar carried by each of the support arms, said rack bars being arranged to cross each other in pairs and a single control element operable for simultaneously extending the supporting arms.

3. A chuck including a casing, support arms extensible from the casing; a shaft entering the casing; an element carried by said shaft for simultaneous operation of all of said support arms; and means constituting a locking arrangement between said shaft and said casing, whereby said support arms may be automatically maintained in any of their extended positions.

4. A chuck including a casing, support arms extensible from the casing; locking means to maintain the support arms in their extended positions with respect to the casing; yieldable means normally controlling the engagement of said locking means; and means for automatically withdrawing said locking means for operation, against the action of said yieldable means, to permit retraction of said support arms into the casing.

5. A chuck including a casing, support arms extensible with respect to the casing, a drive element operable simultaneously upon all of said support arms; locking means arranged between said drive element and the casing to maintain the arms in any of their extended positions: and means mounted by said drive element for automatic control of said locking means in the projection of the support arms from the casing or their retraction thereinto.

6. A chuck including a casing, support arms extensible from the casing; a shaft entering the casing; a drive element carried by the shaft for simultaneous operation of all of said support arms; locking means arranged between said shaft and said casing to maintain the support arms in any of their extended positions; and a hand wheel carried by said shaft for manual control of said extensible arms, said hand wheel having a differential movement with respect to the shaft for automatic control of said locking means in the projection of the support arms from the casing or the retraction of the arms thereinto.

7. A chuck including a casing, arms expansible with respect to the casing; and support means carried by each of said arms and adapted to automatically clamp upon the object to be supported by said chuck, in accordance with the weight of said object and with the amount of projection of said arms from the chuck casing.

8. A chuck including a casing, arms expansible with respect to the casing; support means carried by each of said arms and capable of exerting an automatic clamping action upon the object to be supported in said chuck; an operating element for simultaneously actuating each of said arms; and a locking means arranged between said operating element and the casing to maintain the support arms in any of their projected positions.

9. A chuck including a casing, arms expansible with respect to the casing; support means carried by each of said arms and capable of exerting an automatic clamping action upon the object to be supported in said chuck; an operating element for simultaneously actuating each of said arms; a locking means arranged between said operating element and the casing to maintain the support arms in any of their projected positions; and means for manually controlling said operating element, said manual control means exercising an automatic selective control of said locking means for the maintenance of the support arms in their projected position or for the retraction of the support arms into the casing.

In testimony whereof we have signed our names in the presence of two subscribing witnesses.

WILLIAM C. TYLER.
GLEN B. HEFFELFINGER.

Witnesses:
C. V. P. NEWBOLD,
H. S. KREIGHBAUM.